United States Patent
Chiang et al.

(10) Patent No.: US 10,880,753 B1
(45) Date of Patent: Dec. 29, 2020

(54) MASTER BASE STATION AND RESOURECE ALLOCATION INDICATING METHOD

(71) Applicant: Sercomm Corporation, Taipei (TW)

(72) Inventors: Kun-Lin Chiang, Taipei (TW); Shao-Yu Chien, Taipei (TW); Jen-Feng Huang, Taipei (TW)

(73) Assignee: Sercomm Corporation, Taipei (TW)

( * ) Notice: Subject to any disclaimer, the term of this patent is extended or adjusted under 35 U.S.C. 154(b) by 0 days.

(21) Appl. No.: 16/579,814

(22) Filed: Sep. 23, 2019

(30) Foreign Application Priority Data

Aug. 20, 2019 (TW) .............................. 108129609 A

(51) Int. Cl.
*H04W 16/16* (2009.01)
*H04W 72/04* (2009.01)
(Continued)

(52) U.S. Cl.
CPC ........... *H04W 16/16* (2013.01); *H04L 1/0009* (2013.01); *H04L 5/0005* (2013.01); *H04W 72/0453* (2013.01)

(58) Field of Classification Search
CPC ............. H04W 16/16; H04W 72/0453; H04L 1/0009; H04L 5/0005
See application file for complete search history.

(56) References Cited

U.S. PATENT DOCUMENTS 8,477,799 B2  7/2013  Hwang et al.
8,885,560 B2  11/2014 Wallen et al.
(Continued)

FOREIGN PATENT DOCUMENTS

CN  108174450  6/2018
CN  108207032  6/2018
(Continued)

OTHER PUBLICATIONS

Anique Akhtar et al., , "Downlink resource allocation and packet scheduling in multi-numerology wireless systems," 2018 IEEE Wireless Communications and Networking Conference Workshops (WCNCW), Apr. 2018, pp. 362-367.
(Continued)

*Primary Examiner* — Kyaw Z Soe
(74) *Attorney, Agent, or Firm* — JCIPRNET

(57) ABSTRACT

A master base station and a resource allocation indicating method are provided. The master base station and a distributed base station are based on a layer 1-layer 2 split technology. A bandwidth part (BWP) configuration is enabled. Different BWP configurations have different configurations in a frequency domain. The BWP configuration corresponds to continuous and part of the common resource units, and corresponds to a common configuration to generate a corresponding relation, which is related to a corresponding situation between identifications of the local resource units and the common resource units. The identifications of the local resource units are used in the BWP configuration to identify the local resource units, and the identifications of the common resource units are used in the common configuration to identify the common resource units. The corresponding relation is transmitted. Accordingly, the BWP can be applied to a transmission interface of layer 1-layer 2 split technology.

10 Claims, 4 Drawing Sheets

(51) Int. Cl.
*H04L 1/00* (2006.01)
*H04L 5/00* (2006.01)

(56) References Cited

U.S. PATENT DOCUMENTS

| | | |
|---|---|---|
| 2016/0014778 A1 | 1/2016 | Zhou et al. |
| 2018/0176937 A1 | 6/2018 | Chen et al. |
| 2018/0183551 A1 | 6/2018 | Chou et al. |
| 2018/0338253 A1 | 11/2018 | Nagaraja et al. |
| 2018/0368116 A1 | 12/2018 | Liao et al. |
| 2019/0036673 A1 | 1/2019 | Chen et al. |
| 2019/0053103 A1 | 2/2019 | Manolakos et al. |
| 2019/0053227 A1 | 2/2019 | Huang et al. |
| 2019/0132109 A1 | 5/2019 | Zhou et al. |
| 2019/0132110 A1 | 5/2019 | Zhou et al. |
| 2019/0132824 A1 | 5/2019 | Jeon et al. |
| 2019/0132845 A1 | 5/2019 | Babaei et al. |
| 2019/0132857 A1 | 5/2019 | Babaei et al. |
| 2019/0132862 A1 | 5/2019 | Jeon et al. |
| 2019/0141546 A1 | 5/2019 | Zhou et al. |
| 2019/0141647 A1* | 5/2019 | Nimbalker ............ H04W 4/40 |
| 2019/0141695 A1 | 5/2019 | Babaei et al. |
| 2019/0141697 A1 | 5/2019 | Islam et al. |
| 2019/0141742 A1 | 5/2019 | Zhou et al. |
| 2019/0149213 A1 | 5/2019 | Zhou et al. |
| 2019/0149305 A1 | 5/2019 | Zhou et al. |
| 2019/0149380 A1 | 5/2019 | Babaei et al. |
| 2019/0150118 A1 | 5/2019 | Nam et al. |
| 2019/0158326 A1 | 5/2019 | Liao et al. |
| 2019/0306923 A1* | 10/2019 | Xiong ............... H04W 72/042 |

FOREIGN PATENT DOCUMENTS

| | | |
|---|---|---|
| CN | 108633059 | 10/2018 |
| CN | 108809507 | 11/2018 |
| CN | 108934075 | 12/2018 |
| CN | 108966181 | 12/2018 |
| CN | 109150785 | 1/2019 |
| CN | 109309558 | 2/2019 |
| CN | 109392160 | 2/2019 |
| CN | 109474311 | 3/2019 |
| CN | 109586866 | 4/2019 |
| CN | 109586881 | 4/2019 |
| CN | 109699054 | 4/2019 |
| CN | 109788573 | 5/2019 |
| CN | 109803363 | 5/2019 |
| EP | 3478019 | 5/2019 |
| EP | 3484057 | 5/2019 |
| WO | 2019094781 | 5/2016 |
| WO | 2018082016 | 5/2018 |
| WO | 2018085145 | 5/2018 |
| WO | 2018126441 | 7/2018 |
| WO | 2018126474 | 7/2018 |
| WO | 2018128855 | 7/2018 |
| WO | 2018203717 | 11/2018 |
| WO | 2018204884 | 11/2018 |
| WO | 2019026514 | 2/2019 |
| WO | 2019084570 | 5/2019 |
| WO | 2019095251 | 5/2019 |
| WO | 2019099817 | 5/2019 |

OTHER PUBLICATIONS

Jeongho Jeon, "NR Wide Bandwidth Operations," IEEE Communications Magazine, Mar. 2018, pp. 42-46.

Sahar Imtiaz et al., , "Random forests resource allocation for 5G systems: Performance and robustness study," 2018 IEEE Wireless Communications and Networking Conference Workshops (WCNCW), Apr. 2018, pp. 326-331.

Haibo Mei et al., , "Multi-Layer Cloud-RAN With Cooperative Resource Allocations for Low-Latency Computing and Communication Services," IEEE Access, vol. 5, Sep. 14, 2017, pp. 19023-19032.

Nuo Yu et al., , "Multi-resource allocation in cloud radio access networks," 2017 IEEE ICC Next Generation Networking and Internet Symposium, May 2017, pp. 1-6.

Ismail Alqerm et al., "Enhanced machine learning scheme for energy efficient resource allocation in 5G heterogeneous cloud radio access networks," 2017 IEEE, Oct. 2017, pp. 1-7.

Qiong Jia et al., , "A novel method of baseband pool resource allocation in Cloud Radio Access Network system," 2015 12th International Conference on Fuzzy Systems and Knowledge Discovery (FSKD), Aug. 2015, pp. 2034-2038.

Zehong Lin et al., , "Joint Uplink-Downlink Resource Allocation in OFDMA Cloud Radio Access Networks," 2018 IEEE, May 2018, pp. 1-6.

Mohamad Kalil et al., , "A Framework for Joint Wireless Network Virtualization and Cloud Radio Access Networks for Next Generation Wireless Networks," IEEE Access, vol. 5, Aug. 30, 2017, pp. 20814-20827.

Ahmed Douik et al., , "Low-Complexity Scheduling and Power Adaptation for Coordinated Cloud-Radio Access Networks," IEEE Communications Letters, vol. 21, No. 10, Oct. 2017, pp. 2298-2301.

3GPP, "Technical Specification Group Radio Access Network; NR; Physical layer procedures for data (Release 15)", 3GPP TS 38.214 V15.6.0, Jun. 2019, pp. 1-105.

3GPP, "Technical Specification Group Radio Access Network; Study on CU-DU lower layer split for NR; (Release 15)", 3GPP TR 38.816 V15.0.0, Dec. 2017, pp. 1-16.

3GPP, "Technical Specification Group Radio Access Network; NR; Physical channels and modulation (Release 15)", 3GPP TS 38.211 V15.6.0, Jun. 2019, pp. 1-93.

"Office Action of Taiwan Counterpart Application", dated May 4, 2020, p. 1-p. 12.

* cited by examiner

| CRB 0 | RBG 0 | |
| CRB 1 | | PRB 0 |
| CRB 2 | RBG 1 | PRB 1 |
| CRB 3 | | PRB 2 |
| CRB 4 | RBG 2 | PRB 3 |
| CRB 5 | | PRB 4 |
| CRB 6 | RBG 3 | PRB 5 |
| CRB 7 | | PRB 6 |
| CRB 8 | RBG 4 | PRB 7 |
| CRB 9 | | PRB 8 |
| CRB 10 | RBG 5 | PRB 9 |

FIG. 7A

| CRB 0 | | |
| CRB 1 | | |
| CRB 2 | RBG 0 | PRB 0 |
| CRB 3 | | PRB 1 |
| CRB 4 | RBG 1 | PRB 2 |
| CRB 5 | | PRB 3 |
| CRB 6 | RBG 2 | PRB 4 |
| CRB 7 | | PRB 5 |
| CRB 8 | RBG 3 | PRB 6 |
| CRB 9 | | PRB 7 |
| CRB 10 | RBG 4 | PRB 8 |

FIG. 7B

MASTER BASE STATION AND RESOURECE ALLOCATION INDICATING METHOD

CROSS-REFERENCE TO RELATED APPLICATION

This application claims the priority benefit of Taiwan application serial no. 108129609, filed on Aug. 20, 2019. The entirety of the above-mentioned patent application is hereby incorporated by reference herein and made a part of this specification.

BACKGROUND

Technical Field

The invention relates to radio resource distribution, and more particularly, relates to a master base station and a resource allocation indicating method.

Description of Related Art

In recent years, there has been an increasing demand from people, enterprises or governments for mobile communication networks, Internet of Things (IoT) related devices and application services thereof, and study and research on relevant standards are continuously carried out to improve the efficiency. It should be noted that in order to increase the coverage rate, increase the system capacity or improve the online experience, a small cell is one of the key developments in recent years. In a small cell forum (SCF), a network functional application platform interface (nFAPI) is proposed to split the functions of the fronthaul link. FIG. 1 is a schematic diagram of a conventional system architecture. Referring to FIG. 1, a base station can be divided into a centralized unit (CU) and a distributed unit (DU). In the standard specification of the nFAPI, the media access control (MAC)-physical (PHY) split is a split architecture that has been adopted by many manufacturers in the development process of long term evolution (LTE). In the MAC-PHY split architecture, the CU is responsible for the functions of a service data adaptation protocol (SDAP) layer, a packet data convergence protocol (PDCP) layer, a radio link control (RLC) layer, an MAC layer and a PHY control (CTRL) layer, and the DU is responsible for the functions of a PHY-layer 1 (L1).

On the other hand, the fifth generation (5G)-next generation (NR) communication introduces the concept of a bandwidth part (BWP) in a carrier frequency band. Each BWP configuration includes continuous common resource blocks (RB), and each BWP configuration has independent parameter configurations (such as a starting resource block and a resource block number). It should be noted that, because the fourth generation (4G) mobile communication does not use the BWP technology, after a system end specifies a specific frequency band, a layer 1 and a layer 2 (L2) (namely the CU and the DU) have the same cognitions for resource block positions in the specified frequency band. However, the introduction of the BWP technology will cause inconsistent cognitions of the layer 1 and the layer 2 for the resource block positions.

FIG. 2 is a schematic diagram corresponding to resource blocks. Referring to FIG. 2, it is assumed that 8 common resource blocks (CRB) are provided and two BWP configurations BWP0 and BWP1 correspond to two frequency bands which are not overlapped. Physical resource blocks PRB0 of the two BWP configurations BWP0 and BWP1 respectively correspond to common blocks CRB0 and CRB3. In the prior art, the CU informs the DU of the resource allocation result according to a logical index (for example, the value is 1) of the physical resource block PRB0. However, the logical indexes of the different BWP configurations BWP0 and BWP1 for local resource blocks may be repeated, and the DU is unable to learn that the physical resource block PRB0 in the BWP configuration BWP1 corresponds to the common block CRB3 (which is mistaken for the common block CRB0). Therefore, the introduction of the BWP technology will require modifications to the existing nFAPI.

SUMMARY

Based on the above, the embodiment of the invention is directed to a master base station and a resource allocation indicating method which provide a conversion from a BWP configuration to a common configuration so that the BWP can be applied to a layer 1-layer 2 split technology.

The resource allocation indicating method according to the embodiment of the invention is applicable to the master base station. The master base station is connected with one or more distributed base stations, and the master base station and the distributed base station are based on the layer 1-layer 2 split technology. The resource allocation indicating method includes the following steps. A bandwidth part (BWP) configuration is enabled. Different BWP configurations have different configurations for a radio resource in a frequency domain, the radio resource includes a plurality of common resource units, and the BWP configuration corresponds to continuous and part of the common resource units. The BWP configuration is matched with a common configuration to generate a corresponding relation. The corresponding relation is related to a corresponding situation between identifications of a plurality of local resource units and identifications of the common resource units, the identifications of the local resource units are used in the BWP configuration to identify the local resource units, and the identifications of the common resource units are used in the common configuration to identify the common resource units. The corresponding relation is transmitted, and the corresponding relation is used by the distributed base station.

The master base station according to the embodiment of the invention includes a base station transmission interface and a processor. The base station transmission interface is used for connecting one or more distributed base stations. The master base station and the distributed base station are based on the layer 1-layer 2 split technology. The processor is coupled to the base station transmission interface, enables a BWP configuration, matches the BWP configuration with a common configuration to generate a corresponding relation, and transmits the corresponding relation through the base station transmission interface. Different BWP configurations have different configurations for a radio resource in a frequency domain, the radio resource includes a plurality of common resource units, and the BWP configuration corresponds to continuous and part of the common resource units. The corresponding relation is related to a corresponding situation between identifications of a plurality of local resource units and identifications of the common resource units, the identifications of the local resource units are used in the BWP configuration to identify the local resource units, and the identifications of the common resource units are used in the common configuration to identify the common resource units. The corresponding relation is used by the distributed base station.

Based on the above, by adopting the master base station and the resource allocation indicating method according to the embodiment of the invention, the corresponding relation between the BWP configuration and the common resource unit is notified to the distributed base station. When the BWP configuration is unknown, the distributed base station can obtain a correct resource unit position from a resource allocation result simply based on the corresponding relation. In this way, the BWP can be applied to a transmission interface of the layer 1-layer 2 split technology according to the embodiment of the invention.

In order to make the aforementioned and other objectives and advantages of the invention comprehensible, embodiments accompanied with figures are described in detail below.

BRIEF DESCRIPTION OF THE DRAWINGS

FIG. 7A and FIG. 7B are two examples of the corresponding relation.

DESCRIPTION OF THE EMBODIMENTS

Figure 3:
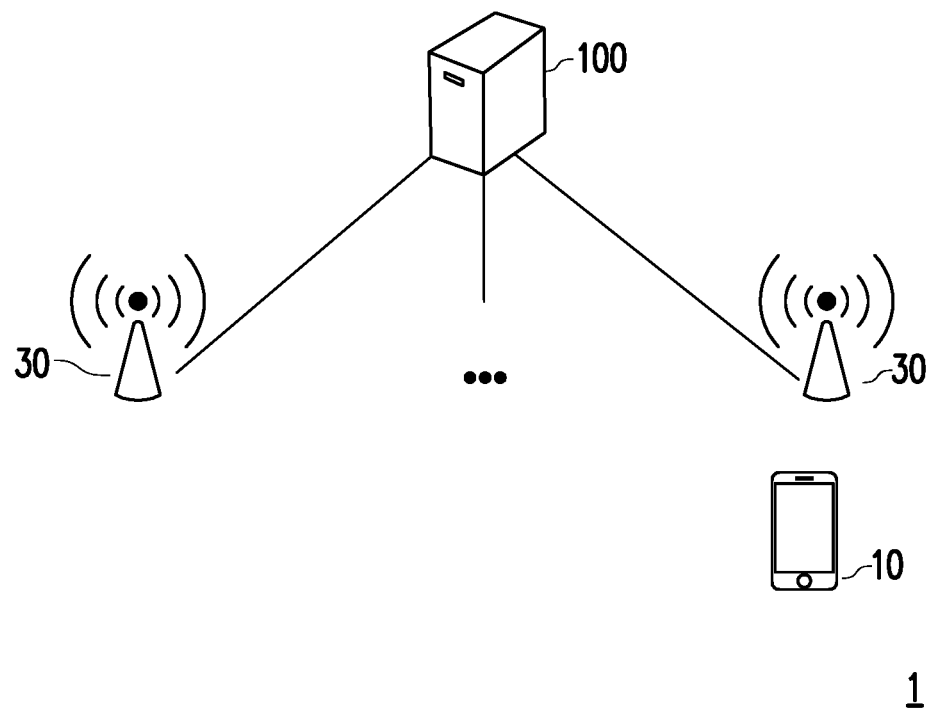
FIG. 3 is a schematic diagram of a communication system according to an embodiment of the invention.

FIG. 3 is a schematic diagram of a communication system 1 according to an embodiment of the invention. Referring to FIG. 3, the communication system 1 includes, but is not limited to, one or more user equipment (UE) 10, one or more distributed base stations 30 and a master base station 100. The communication system 1 is applicable to 4G, 5G or other generational mobile networks.

The user equipment 10 may be a mobile station, an advanced mobile station (AMS), a telephone device, customer premise equipment (CPE), or a wireless sensor and the like.

Figure 1:
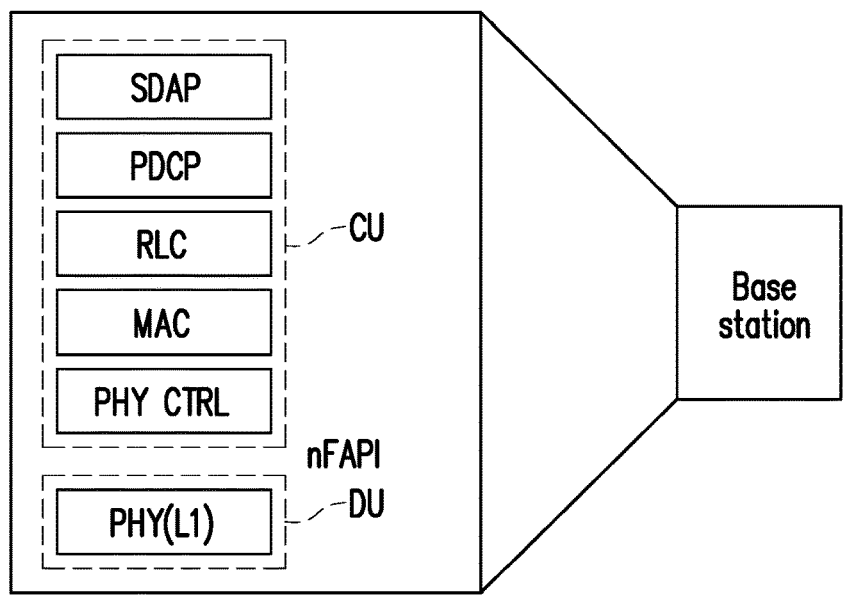
FIG. 1 is a schematic diagram of a conventional system architecture.

The distributed base station 30 may be referred to as a distributed unit (DU), or a transmission reception point (TRP). The master base station 100 may be referred to as a centralized unit (CU). The distributed base station 30 and the master base station 100 may be collectively referred to as a home evolved node B (HeNB), an eNB, a next generation node B (gNB), a base transceiver system (BTS), a relay, or a repeater. It should be noted that the master base station 100 and the distributed base station 30 according to the embodiment of the invention are based on the layer 1-layer 2 split technology (or MAC-PHY split defined by SCF), wherein the distributed base station 30 is responsible for layer 1 functions, and the master base station 100 is responsible for layer 2 functions (which may include higher-level functions). For example, the master base station 100 shown in FIG. 1 corresponds to the CU, and the distributed base station 30 corresponds to the DU. It should be noted that the distributed base station 30 and the master base station 100 may be two independent devices.

Figure 4:
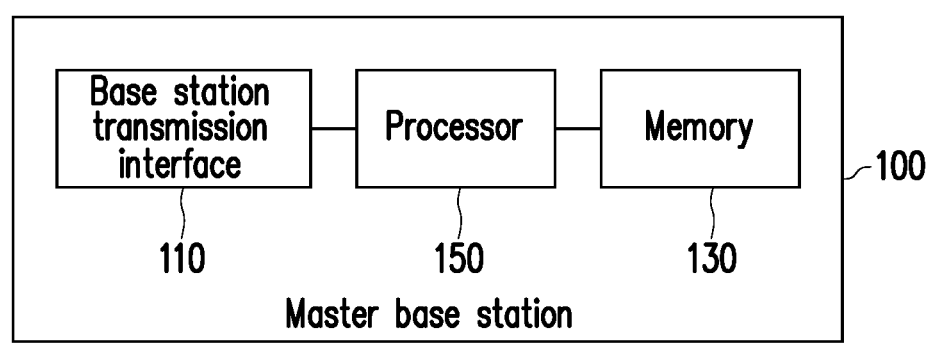
FIG. 4 is a block diagram showing components of a master base station according to an embodiment of the invention.

FIG. 4 is a block diagram showing components of a master base station 100 according to an embodiment of the invention. Referring to FIG. 4, the master base station 100 includes, but is not limited to, a base station transmission interface 110, a memory 130 and a processor 150.

The base station transmission interface 110 may be an Ethernet, an optical fiber network or other transmission interfaces. The base station transmission interface 110 is used for connecting the distributed base station 30 and transmitting messages to the distributed base station 30 or receiving messages from the distributed base station 30. It should be noted that a communication between the base station transmission interface 110 and the distributed base station 30 may be based on an nFAPI standardized interface defined by the SCF or other protocols for a communication between layers 1 and 2.

The memory 130 may be any type of fixed or movable random access memory (RAM), read-only memory (ROM), flash memory, similar components, or a combination of the above components. The memory 130 is used for recording program codes, device configurations, a codebook and buffered or permanent data (such as a corresponding relation and identifications related to resource block indexes), and recording various other communication protocol related software modules, such as a PHY CTRL layer, and the related descriptions will be described in the following embodiments.

The processor 150 is configured to process digital signals and execute programs according to the exemplary embodiments of the invention, and can access or load the data and software modules recorded by the memory 130. The functions of the processor 150 can be implemented by programmable units, such as a central processing unit (CPU), a microprocessor, a microcontroller, a digital signal processing (DSP) chip, and a field programmable gate array (FPGA). The functions of the processor 150 can also be implemented by an independent electronic device or an integrated circuit (IC), and the operation of the processor 150 can also be implemented by software.

In order to facilitate the understanding of the operation processes of the embodiment of the invention, the operation processes of the communication system 1 in the embodiment of the invention will be described in detail with reference to various embodiments below. Hereinafter, the method in the embodiment of the invention will be described in conjunction with each device and components thereof in the communication system 1. Each process of the method in the embodiment of the invention may be adjusted according to the implementation situation, and is not limited thereto.

Figure 5:
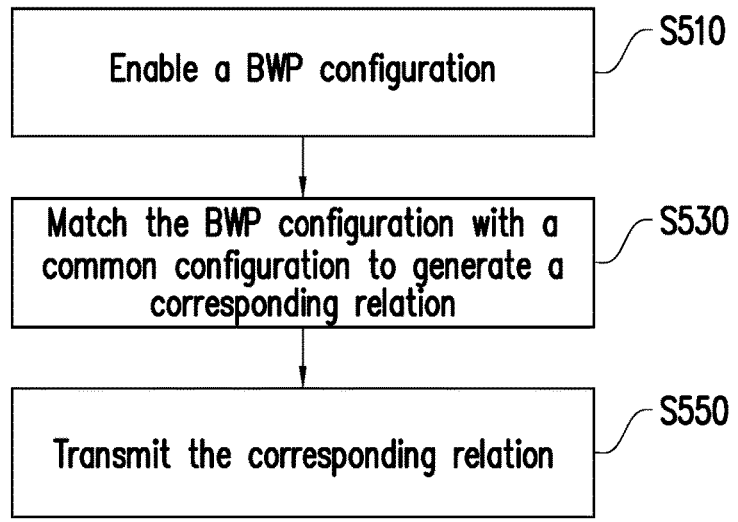
FIG. 5 is a flowchart of a resource allocation indicating method according to an embodiment of the invention.

FIG. 5 is a flowchart of a resource allocation indicating method according to an embodiment of the invention. Referring to FIG. 5, the processor 150 enables a bandwidth part (BWP) configuration (step S510). Specifically, the BWP is a set of continuous physical resource units (such as resource blocks or other resource units) in a radio resource. The physical resource units are selected from a plurality of continuous common resource units (such as common resource blocks defined by 3GPP TS 38.211, and other common resource units) (that is, the BWP configuration corresponds to continuous and part of the common resource units). The common resource blocks commonly form a carrier bandwidth and are used for a signal transmission between the distributed base stations 30 and the user equipment 10. The BWP configuration may include parameters such as a starting position, the number of continuous resource units, and/or a subcarrier spacing in the physical resource units. Different BWP configurations have different configurations in a frequency domain for the common resource units in a radio resource, i.e., the BWP configurations have different parameters.

It should be noted that the BWP may be defined by 3GPP TS 38.211&38.213, or may be defined in other standards. The so-called "continuous" refers to a plurality of resource units arranged in the frequency domain according to their indexes/serial numbers/center frequency sizes. For example, the resource block of an index 3 is located between two resource blocks of an index 2 and an index 4. Furthermore, the parameters in the BWP configuration are not particularly limited in the embodiment of the invention.

Then, the processor 150 matches the BWP configuration with the common configuration to generate the corresponding relation (step S530). Specifically, in the prior art, because the cognitions for the positions of resource units between the CU and the DU are different, the UE 10 may use the same resource unit at the same time. In order to apply the BWP technology to the transmission interface (such as nFAPI) of the layer 1-layer 2 split technology, the following solution is proposed by the embodiment of the invention. One of the main functions of the solution is to establish a corresponding situation between identifications of a plurality of local resource units and identifications of the common resource units, and the corresponding relation is related to the corresponding situation. The local resource units refer to the resource units set by the BWP configuration, such as resource blocks with a specific starting position and a specific number. The local resource units may be physical resource blocks defined by 3GPP TS38.211, or other resource units.

The identifications of the local resource units are used in the BWP configuration to identify the local resource units. The identification may be a unique index, sequence or code, and the identification corresponding to each resource unit is different from the others. In an embodiment, the identifications are related to an order of the center frequency sizes. For example, among the local resource units, one with the lowest center frequency has an index of 0, one with the second lowest center frequency has an index of 1, and so on.

Figure 2:
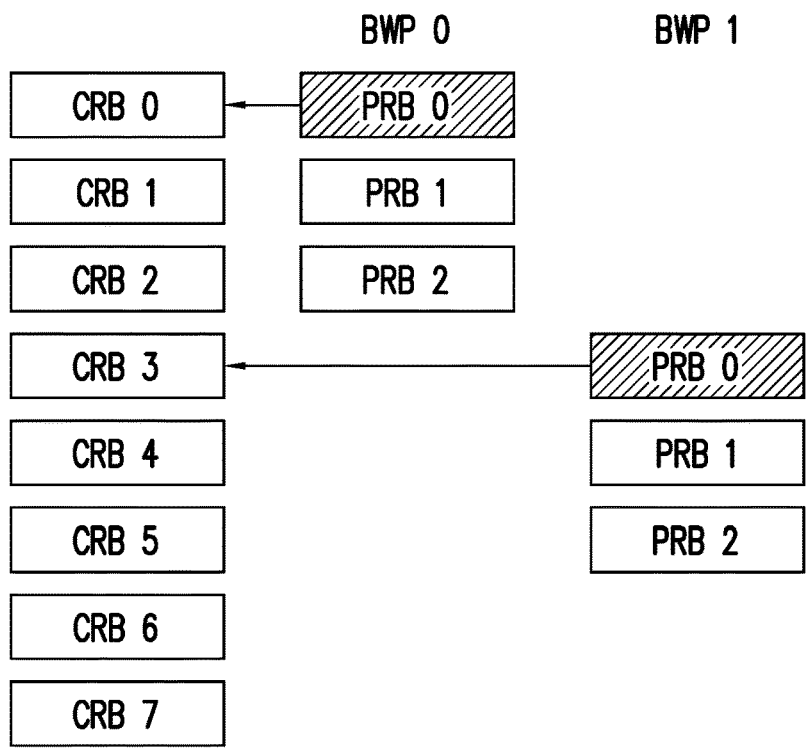
FIG. 2 is a schematic diagram corresponding to resource blocks.

On the other hand, the identifications of the common resource units are used in the common configuration to identify the common resource units, and the common configuration can be shared by the master base station 100 and the distributed base stations 30 in a radio access network (RAN). Since the starting position of the BWP configuration in the common resource units is not necessarily the first common resource unit (namely, one with the lowest center frequency), the identifications of the local resource units may be different from the identifications of the common resource units sorted in the same positions (sorted according to the center frequency sizes). Taking FIG. 2 as an example, the physical resource block PRB0 (the index 0) in the BWP configuration BWP1 corresponds to the common resource block CRB3 (the index 3), instead of corresponding to the common resource block CRB0 (the index 0). Therefore, if the distributed base stations 30 can learn of the corresponding relation between the local resource units and the common resource units, the master base station 100 and the distributed base stations 30 will have the same cognitions for the resource unit positions.

In an embodiment, the processor 150 groups a plurality of common resource units according to the BWP configuration to generate a corresponding relation. Specifically, a resource allocation type 0 is defined in 3GPP TS 38.214 to include a bitmap for resource block configuration information. The bitmap is used for indicating a resource block group (RBG) allocated to one specific UE 10, and one block group is a set of continuous resource blocks.

Based on the similar concept, in the embodiment of the invention, the common resource units are grouped to form a plurality of groups. The common resource units included by the groups are not repeated, a maximum number of the common resource units included in each group is the same, and the identifications corresponding to the common resource units included in each group and the adjacent group are continuous. For example, a first group includes a first common resource unit, a second group includes second and third common resource units, and a third group includes fourth and fifth common resource units.

It should be noted that the corresponding relation further includes the starting position of the local resource units corresponding to the common resource units, and the starting position corresponds to one of the common resource units. If sorted according to the center frequency sizes, the starting position is the identification related to the sorted first local resource unit corresponding to the common resource unit of the same center frequency. Since the local resource units included by any BWP configuration are continuous, based on the starting position, the difference in the identifications between the local resource unit and the common resource unit sorted in the same position can be obtained. Taking FIG. 2 as an example, the starting position of the physical resource block PRB0 in the BWP configuration BWP1 is the common resource block CRB3 or a value of 4. Furthermore, based on the foregoing grouping concept, if the local resource units in the BWP configuration adopt the same group size (i.e., the number of resource units in each single group is the same), the processor 150 can use the difference between the corresponding groups of the sorted first local resource unit and the sorted first common resource unit to represent the starting position (assuming both are sorted according to the center frequency sizes from small to large).

In an embodiment, the corresponding relation includes a group size, a resource number, a group shift number and a resource allocation position. The group size is equal to the maximum number of the local resource units included in each group, such as 2, 4, 8 or 16. The resource number is the number of the local resource units included in the first group sorted at the first place of the groups grouped by the local resource units. For example, if the group size is 8, the resource number may be 1 to 8. The group shift number is related to the starting position. A value of the group shift number is the number of groups between the sorted first group and the group of the sorted first common resource unit, and such value may be a quotient of the index/serial number of the common resource unit corresponding to the sorted first group divided by the group size. For example, if the index of the common resource unit corresponding to the first group is 4 (the indexes are started from 0 and arranged from the lowest center frequency to the highest center frequency) and the group size is 4, the group shift number is 1. The resource allocation positions are related to the allocated groups, i.e., the groups are already allocated to the specific UE 10. The resource allocation position may be the bitmap of said allocation type 0 with bit positions corresponding to a sorting order of the groups. For example, the most significant bit (MSB) to the least significant bit (LSB) sequentially correspond to the sorted first group to the last group. Furthermore, in the resource allocation position, codes corresponding to the allocated groups are different from codes corresponding to the unallocated groups. For example, a bit value for those allocated is 1, and a bit value for those unallocated is 0.

Figure 6:
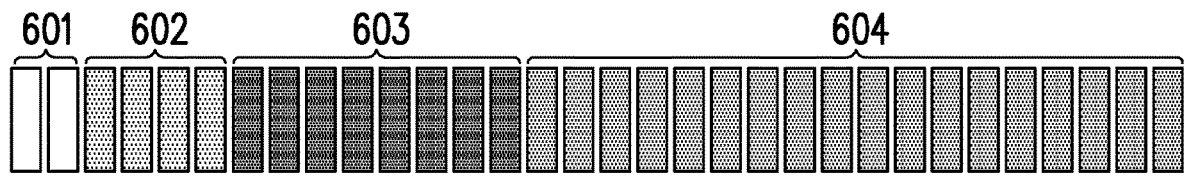
FIG. 6 is a schematic diagram of a data format of a corresponding relation according to an embodiment of the invention.

In an embodiment, the corresponding relation may be expressed in a binary data format. FIG. 6 is a schematic diagram of a data format of a corresponding relation according to an embodiment of the invention. Referring to FIG. 6, the data format includes a group size 601, a resource number 602, a group shift number 603 and a resource allocation position 604. It should be noted that the number of bits of each parameter shown in FIG. 6 is determined according to the resource block group size corresponding to the bandwidth part size defined by 3GPP TS 38.214. Table (1) shows the corresponding relation between the bandwidth part size and the resource block group size (the unit is the resource block number):

TABLE 1

| Bandwidth part size | Resource block group size | |
|---|---|---|
| | Configuration 1 | Configuration 2 |
| 1-36 | 2 | 4 |
| 37-72 | 4 | 8 |
| 37-144 | 8 | 16 |
| 145-275 | 16 | 16 |

The resource block group size may be 2, 4, 8 or 16, and the group size 601 may be represented by "00", "01", "10" and "11" respectively. Since the maximum group size is 16, the resource number 602 may be a value from 0 to 15 and may be represented by a value from "0000" to "1111". The resource block group has a maximum of 18, so the maximum value of the group shift number is 18, all values of the group shift number 603 may be represented by 6 bits, and the resource allocation position 604 may be represented by 18 bits. In other embodiments, the number of the bits of each parameter may be changed according to the requirements.

FIG. 7A and FIG. 7B are two examples of the corresponding relation. Referring to FIG. 7A, it is assumed that the corresponding relation of the data format of FIG. 6 is "000001000000001100000000000000000" (bottom lines are only used for identifying different parameters). The group size 601 is 2 (resource block groups RBG0 to RBG5 include at most two physical resource blocks), and is thus represented by "00". The resource number 602 is 1 (the number of the physical resource blocks included by the resource block group RBG0 is 1), and is thus represented by "0001". The group shift number 603 is 0 (the quotient of the serial number 0 of the common resource block CRB0 corresponding to the resource block group RB G0 divided by 2 is 0), and is thus represented by "000000". Assuming that the resource block groups RBG0 and RBG1 are already allocated, the resource allocation position 604 is represented by "110000000000000000".

Referring to FIG. 7B, it is assumed that the corresponding relation of the data format of FIG. 6 is "000010 000000001110000000000000000" (bottom lines are only used for identifying different parameters). The group size 601 is 2 (resource block groups RBG0 to RBG4 include at most two physical resource blocks), and is thus represented by "00". The resource number 602 is 2 (the number of the physical resource blocks included by the resource block group RB G0 is 2), and is thus represented by "0010". The group shift number 603 is 1 (the quotient of the serial number 2 of the common resource block CRB2 correspond- ing to the resource block group RBG0 divided by 2 is 1), and is thus represented by "000001". Assuming that the resource block groups RBG0 and RBG1 are already allocated, the resource allocation position 604 is represented by "110000000000000000".

It should be noted that in the embodiment of the invention, the data format of the corresponding relation codes is not limited to the format shown in FIG. 6, and the corresponding relation may have other coding forms.

In another embodiment, the corresponding relation includes a resource indication value (RIV). Specifically, a resource allocation type 1 is defined in 3GPP TS 38.214 to include the RIV for resource block configuration information. The RIV corresponds to the starting resource block and the number/length of continuously allocated resource blocks.

Based on the similar concept, the processor 150 according to the embodiment of the invention generates the RIV according to the starting position of the local resource units corresponding to the common resource units and an allocated resource number. Different RIVs correspond to different starting positions and/or different allocated resource numbers, and the starting position corresponds to one of the common resource units. If the RIV is decoded, the identifications of a specific common resource unit and the number of the allocated common resource units (namely, the number of allocated resources) may be generated. In other words, in the embodiment of the invention, a common RIV is generated by the master base station 100 for use by the distributed base stations 30.

The RIV can be obtained by the following equation (1):

$$\text{if } (L_{RBs}-1) \leq \lfloor N_{BWP}^{size}/2 \rfloor,$$

$$RIV = N_{BWP}^{size}(L_{RBs}-1) + RB_{start} + RB_{shift},$$

otherwise, $$RIV = N_{BWP}^{size}(N_{BWP}^{size}-L_{RBs}+1) + (N_{BWP}^{size}-1-RB_{start}-RB_{shift}) \quad (1)$$

RIV represents the resource indication value, $L_{RBs}$ represents the number of allocated local resource units, $N_{BWP}^{size}$ represents a bandwidth size defined by the BWP configuration, $RB_{start}$ represents a starting local resource unit of the allocated local resource units, and $RB_{start}$ represents the number of resource units between the sorted first local resource unit and the sorted first common resource unit (i.e., the starting position of the local resource unit corresponding to the common resource unit).

It should be noted that the data format of RIV coding in the embodiment of the invention is not limited to the equation (1), and any coding mode may be applied as long as the identifications corresponding to the specific common resource units and the number of the allocated common resource units can be generated.

Then, the processor 150 transmits the corresponding relation through the base station transmission interface 110 (step S550) to provide the corresponding relation to the distributed base stations 30 for use. The processor 150 can transmit the corresponding relation to the distributed base stations 30 in each schedule (such as each transmission time interval (TTI)). The corresponding relation can be entrained in a data unit or a message of a resource allocation indication.

In an embodiment, the corresponding relation is recorded in a resource block coding field in a message transmitted by the master base station 100 to the distributed base stations 30, and the corresponding relation is used for generating downlink control information (DCI). For example, a downlink control information protocol data unit (DCI PDU) (entrained in the DL_CONFIG.request message or the UL_CONFIG.request message) defined by the SCF standard specification 082.09.05 includes a resource block coding field and a resource allocation type field. Here, the resource block coding field can record the corresponding relation (such as the data format of FIG. 6 or the common RIV), and the resource allocation type field may be used for identifying whether the used allocation type is the bitmap (the resource allocation type 0) or the RIV (the resource allocation type 1). Furthermore, after the distributed base stations 30 obtain the corresponding relation, the DCI provided to be used by the UE 10 can be generated for the UE 10 to learn of the allocated common resource units.

It should be noted that the existing information field can be used for transmitting the corresponding relation through the above mode. However, in other embodiments, the corresponding relation may also be recorded in other existing fields or new fields. Furthermore, the corresponding relation may also be transmitted to the distributed base stations 30 through data units or messages of other resource allocation indications.

In conclusion, by the master base station and the resource allocation indicating method according to the embodiments of the invention, the BWP configuration is associated with the common resource units to generate the corresponding relation, so that the distributed base stations can obtain correct resource units based on the corresponding relation. In other words, the master base station converts the BWP configuration to the common configuration, so that both the master base station and the distributed base stations can identify the designated resource units based on the common resource units. Accordingly, the BWP can be applied to the transmission interface of the layer 1-layer 2 split technology.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:

1. A resource allocation indicating method applicable to a master base station, wherein the master base station is connected with at least one distributed base station, the master base station and the at least one distributed base station are based on a layer 1-layer 2 split technology, and the resource allocation indicating method comprises:
   enabling a bandwidth part (BWP) configuration, wherein different BWP configurations have different configurations for a radio resource in a frequency domain, the radio resource comprises a plurality of common resource units, and the BWP configuration corresponds to continuous and part of the common resource units;
   matching the BWP configuration with a common configuration to generate a corresponding relation, wherein the corresponding relation is related to a corresponding situation between identifications of a plurality of local resource units and identifications of the common resource units, the identifications of the local resource units are used in the BWP configuration to identify the local resource units, and the identifications of the common resource units are used in the common configuration to identify the common resource units; and
   transmitting the corresponding relation, wherein the corresponding relation is used by the at least one distributed base station.

2. The resource allocation indicating method according to claim 1, wherein the step of matching the BWP configuration with to the common configuration to generate the corresponding relation comprises:
   grouping the common resource units according to the BWP configuration to generate the corresponding relation, wherein a maximum number of at least one of the common resource units included in each group is the same, the corresponding relation comprises a starting position of the local resource units corresponding to the common resource units, and the starting position corresponds to one of the common resource units.

3. The resource allocation indicating method according to claim 2, wherein the corresponding relation comprises a group size, a resource number, a group shift number and a resource allocation position, wherein the group size is equal to the maximum number, the resource number is the number of at least one of the local resource units included in a first group of a plurality of groups grouped by the local resource units, the group shift number is related to the starting position, and the resource allocation position is related to at least one of the groups already allocated.

4. The resource allocation indicating method according to claim 1, wherein the corresponding relation comprises a resource indication value, and the step of matching the BWP configuration with the common configuration to generate the corresponding relation comprises:
   generating the resource indication value according to a starting position of the local resource units corresponding to the common resource units and an allocated resource number, wherein different resource indication values correspond to different starting positions or different allocated resource numbers, and the starting position corresponds to one of the common resource units.

5. The resource allocation indicating method according to claim 1, wherein the corresponding relation is recorded in a resource block coding field in a message transmitted by the master base station to the at least one distributed base station, and the corresponding relation is used for generating downlink control information.

6. A master base station, comprising:
   a base station transmission interface for connecting at least one distributed base station, wherein the master base station and the at least one distributed base station are based on a layer 1-layer 2 split technology; and
   a processor coupled to the base station transmission interface and configured to perform:
      enabling a bandwidth part (BWP) configuration, wherein different BWP configurations have different configurations for a radio resource in a frequency domain, the radio resource comprises a plurality of common resource units, and the BWP configuration corresponds to continuous and part of the common resource units;
      matching the BWP configuration with a common configuration to generate a corresponding relation, wherein the corresponding relation is related to a corresponding situation between identifications of a plurality of local resource units and identifications of the common resource units, the identifications of the local resource units are used in the BWP configuration to identify the local resource units, and the identifications of the common resource units are used in the common configuration to identify the common resource units; and transmitting the corresponding relation through the base station transmission interface, wherein the corresponding relation is used by the at least one distributed base station.

7. The master base station according to claim 6, wherein the processor is configured to perform:

grouping the common resource units according to the BWP configuration to generate the corresponding relation, wherein a maximum number of at least one of the common resource units included in each group is the same, the corresponding relation comprises a starting position of the local resource units corresponding to the common resource units, and the starting position corresponds to one of the common resource units.

8. The master base station according to claim 7, wherein the corresponding relation comprises a group size, a resource number, a group shift number and a resource allocation position, wherein the group size is equal to the maximum number, the resource number is the number of at least one of the local resource units included in a first group of a plurality of groups grouped by the local resource units, the group shift number is related to the starting position, and the resource allocation position is related to at least one of the groups already allocated.

9. The master base station according to claim 6, wherein the corresponding relation comprises a resource indication value, and the processor is configured to perform:

generating the resource indication value according to a starting position of the local resource units corresponding to the common resource units and an allocated resource number, wherein different resource indication values correspond to different starting positions or different allocated resource numbers, and the starting position corresponds to one of the common resource units.

10. The master base station according to claim 6, wherein the corresponding relation is recorded in a resource block coding field in a message transmitted by the base station transmission interface, and the corresponding relation is used for generating downlink control information.

* * * * *